(12) United States Patent
Shimosato

(10) Patent No.: US 11,496,667 B2
(45) Date of Patent: Nov. 8, 2022

(54) ELECTRONIC APPARATUS, CONTROL METHOD, AND STORAGE MEDIUM

(71) Applicant: CANON KABUSHIKI KAISHA, Tokyo (JP)

(72) Inventor: Jiro Shimosato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 16/823,172

(22) Filed: Mar. 18, 2020

(65) Prior Publication Data

US 2020/0314348 A1 Oct. 1, 2020

(30) Foreign Application Priority Data

Mar. 25, 2019 (JP) ............................. JP2019-056302

(51) Int. Cl.
- *H04N 5/232* (2006.01)
- *G06F 3/04817* (2022.01)
- *H04N 5/225* (2006.01)
- *G06F 3/04886* (2022.01)

(52) U.S. Cl.
CPC ... *H04N 5/232127* (2018.08); *G06F 3/04817* (2013.01); *G06F 3/04886* (2013.01); *H04N 5/2252* (2013.01); *H04N 5/23216* (2013.01)

(58) Field of Classification Search
CPC ........... H04N 5/232127; H04N 5/2252; H04N 5/23216; H04N 5/225251; H04N 5/232933; G06F 3/04817; G06F 3/04886
See application file for complete search history.

(56) References Cited

U.S. PATENT DOCUMENTS

| 8,963,857 | B2* | 2/2015 | Kim | G06F 3/1446 |
| | | | | 345/173 |
| 9,232,124 | B2* | 1/2016 | Song | H04N 5/76 |
| 2013/0249809 | A1* | 9/2013 | Kawalkar | G06F 3/04886 |
| | | | | 345/173 |
| 2015/0199108 | A1* | 7/2015 | Feng | H04M 1/72472 |
| | | | | 715/765 |
| 2015/0207985 | A1* | 7/2015 | Uemura | H04N 5/265 |
| | | | | 348/333.01 |
| 2018/0374452 | A1* | 12/2018 | Choi | G06F 3/04883 |
| 2019/0346954 | A1* | 11/2019 | Jung | G06F 1/3209 |
| 2020/0106955 | A1* | 4/2020 | Fleizach | H04N 5/23222 |

FOREIGN PATENT DOCUMENTS

| JP | 2014022850 A | 2/2014 |
| JP | 2017005312 A | 1/2017 |

* cited by examiner

*Primary Examiner* — Michael Roswell
(74) *Attorney, Agent, or Firm* — Canon U.S.A., Inc. IP Division

(57) ABSTRACT

An electronic apparatus including at least a memory and at least one processor which function as a control unit configured to perform control to display a specific icon and set a first range at least partially overlapping with the specific icon as a touch sensitive region of the specific icon in a case where a positional relationship of the display unit with the housing is a first positional relationship, and to perform control to display the specific icon on a side close to the housing relative to a center of a display area in the display unit and set a second range wider than the first range on a side opposite to the housing, at least partially overlapping with the specific icon, as a touch sensitive region of the specific icon in a case where a positional relationship of the display unit with the housing is a second positional relationship.

15 Claims, 8 Drawing Sheets

ELECTRONIC APPARATUS, CONTROL METHOD, AND STORAGE MEDIUM

BACKGROUND

Field of the Disclosure

The present disclosure generally relates to electronics and, more particularly, to an electronic apparatus on which a movable touch panel display is mounted, a control method, and a storage medium.

Description of the Related Art

Conventionally, an apparatus having a movable display such as a variable angle display or a tilt display has been known.

Japanese Patent Application Laid-Open No. 2017-5312 discusses an image-capturing apparatus which enables a user to rotate a display toward the user to execute various settings or image-capturing by touching a display item and a live view screen displayed on a touch panel in order to take a selfie.

Japanese Patent Application Laid-Open No. 2014-22850 discusses an image-capturing apparatus which changes a positional relationship between objects depending on a positional relationship between a main body and a movable display in order to display the objects at positions where the user can easily perform touch operations.

Depending on a positional relationship between a movable display and a housing, operability may not be satisfied because a user's finger interferes with a housing when the user touches a display face of the movable display. For example, when a display face of a movable display arranged on a back face of a digital camera is moved to a confronting position where the display face confronts a photographer, there arises a problem that the photographer cannot easily touch a portion of a movable display. In this case, the display is close to a main body of the digital camera and the main body of the digital camera interferes with the movable display.

Japanese Patent Application Laid-Open No. 2017-5312 and Japanese Patent Application Laid-Open No. 2014-22850 do not consider about the problem that the display face of the movable display cannot be touched easily because of the housing interfering therewith.

SUMMARY

The present disclosure generally relates to a technique which improves operability of a touch operation performed on a display unit in a case where a positional relationship between a housing and a display unit is changed.

According to an aspect of the present disclosure, an electronic apparatus includes a touch detection unit configured to detect a touch operation performed on a display unit capable of changing a positional relationship with a housing, at least a memory and at least one processor which function as a control unit configured to perform control to display a specific icon and set a first range at least partially overlapping with the specific icon as a touch sensitive region of the specific icon in a case where a positional relationship of the display unit with the housing is a first positional relationship, and to perform control to display the specific icon in a region in the display unit close, proximal, or within a predetermined distance to the housing and set a second range wider than the first range on a side opposite to the housing, at least partially overlapping with the specific icon, as a touch sensitive region of the specific icon in a case where a positional relationship of the display unit with the housing is a second positional relationship, and an execution unit configured to execute a function corresponding to the specific icon when a touch operation is performed on the touch sensitive region.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the accompanying drawings. It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

In the present exemplary embodiment, a digital camera (image-capturing apparatus) will be described as an example of the electronic apparatus.

Figure 1:
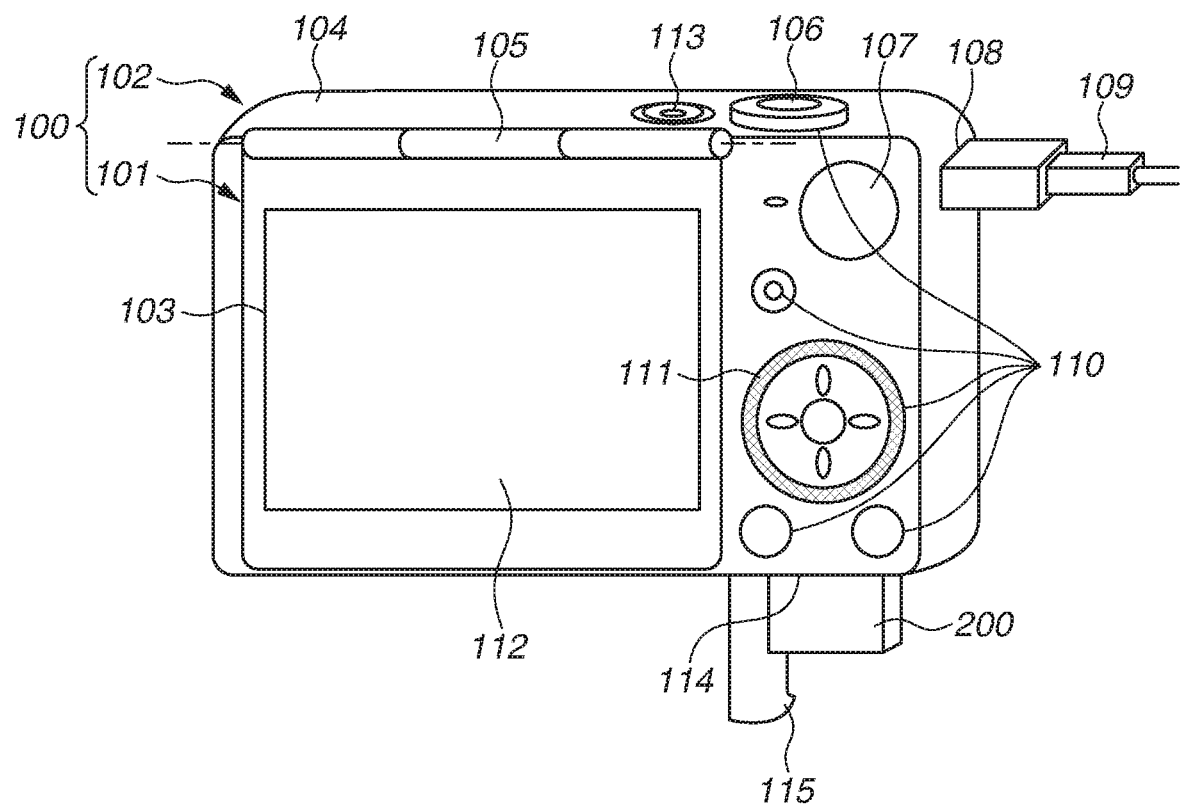
FIG. 1 is a diagram illustrating an example of an external configuration of a camera viewed from a rear face.

FIG. 1 is a diagram illustrating an example of an external configuration of a digital camera 100 (hereinafter, called as "camera 100") viewed from a rear face.

The camera 100 includes a monitor 101 and a main body 102.

The monitor 101 includes a display unit 103 on which an image and various information are displayed. The monitor 101 can change a positional relationship with a housing 104 of the main body 102. Specifically, the monitor 101 is rotated around a hinge 105 by using an upper side of the rectangle as a rotation axis.

Figure 2:
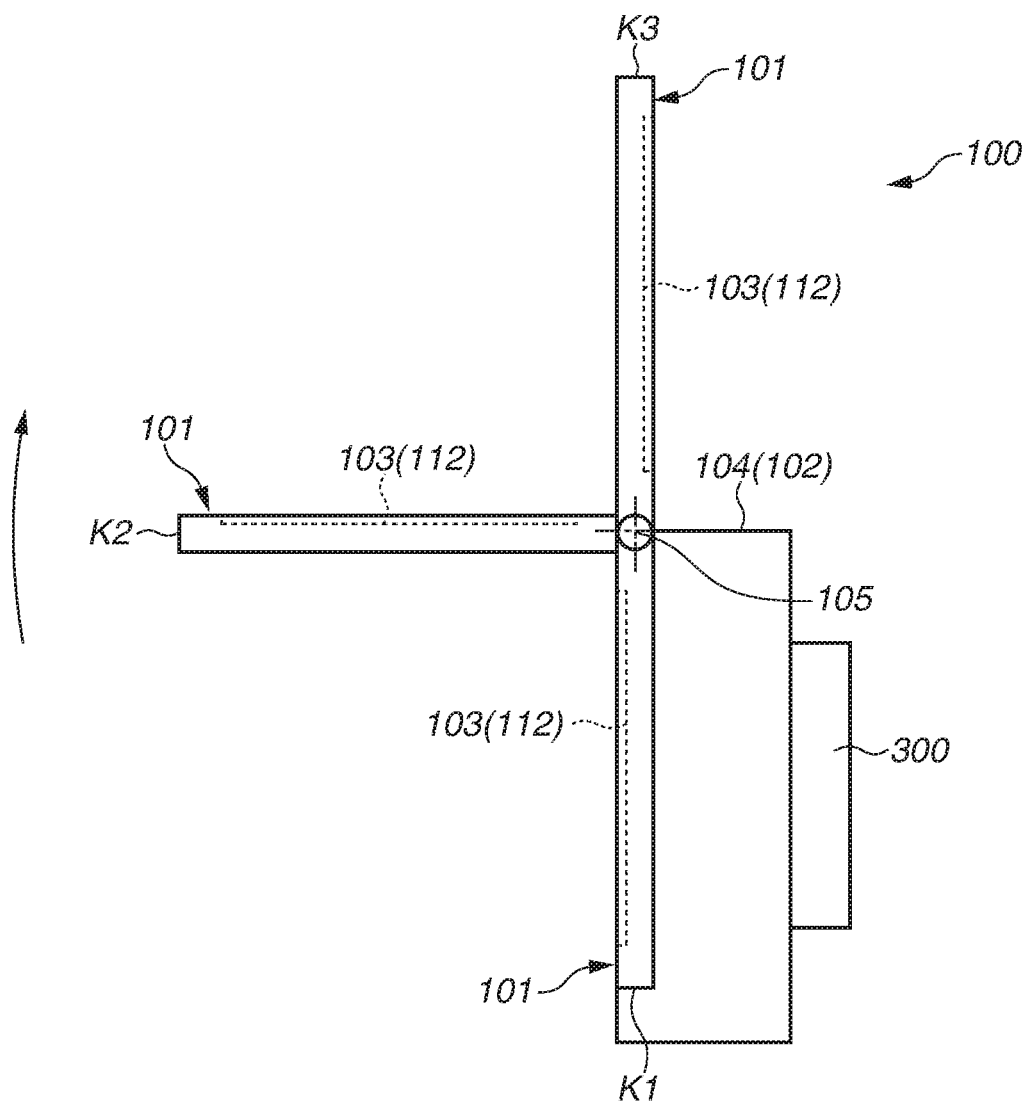
FIG. 2 is a diagram illustrating an example of a configuration of the camera viewed from a side.

FIG. 2 is a diagram illustrating an example of a configuration of the camera 100 viewed from a side. With reference to FIG. 2, a positional relationship will be described in the case where the monitor 101 is rotated around the housing 104.

The monitor 101 can be rotated around the housing 104 from a state K1 to a state K3 via a state K2.

In the state K1, the monitor 101 is housed in the main body 102 (at a rotation angle of 0-degree). In the state K1, a display face of the display unit 103 faces a side opposite to an object side (i.e., a rear face side of the camera 100) without facing the main body 102. In other words, in the state K1, a display direction of the display unit 103 is different from an image-capturing direction, so that the display face of the display unit 103 cannot be checked from the object side that is in the image-capturing direction while the display face can be visually checked by the user from the rear face side. A positional relationship illustrated in the state K1 is called as a normal position. The positional relationship illustrated in the state K1 corresponds to an example of a first positional relationship.

In the state K2, the monitor 101 is rotated by 90-degree from the state K1 in a direction indicated by an arrow in FIG. 2.

In the state K3, the monitor 101 is rotated by 180-degree from the state K1. In the state K3, the display face of the display unit 103 confronts the object side. In other words, in the state K3, the display direction of the display unit 103 is the same as the image-capturing direction, so that the display face of the display unit 103 can be visually checked from the object in the image-capturing direction, but cannot be checked from the rear face side. Further, in the state K3, at least a part of the housing 104 is positioned on a side of the display face of the display unit 103 which confronts the object side. Therefore, it is difficult to execute the touch operation at a portion of the display unit 103, which is close, proximal, or within a predetermined distance to the housing 104 because the user's finger interferes with the housing 104. A positional relationship illustrated in the state K3 is referred to as a confronting position or an inverting position. The positional relationship illustrated in the state K3 corresponds to an example of a second positional relationship.

As described above, the monitor 101 can be rotated around the main body 102 within a range of the rotation angle of 0-degree to 180-degree (or more than 180-degree). The present exemplary embodiment will be described by setting the direction indicated by the arrow in FIG. 2 as a positive rotation direction.

A configuration of the camera 100 will be described with reference to FIG. 1 again.

A shutter button 106 is an operation unit which allows a user to input an image-capturing instruction. A mode shifting switch 107 is an operation unit for shifting to various modes. A connector 108 is a portion to which a connection cable 109 is attached to connect to the external apparatus.

An operation unit 110 receives various user operations. The operation unit 110 includes operation members such as various switches, buttons, a controller wheel 111, and a touch panel 112.

A power switch 113 is a member for switching a power on-off state.

A storage medium 200 is a memory card or a hard disk. The storage medium 200 is housed in a storage medium slot 114. The storage medium 200 housed in the storage medium slot 114 can communicate with the camera 100, and store and reproduce a captured image. The storage medium slot 114 is closed with a cover 115. In the state illustrated in FIG. 1, the cover 115 is removed, and the storage medium 200 is retracted and partially exposed from the storage medium slot 114.

Figure 3:
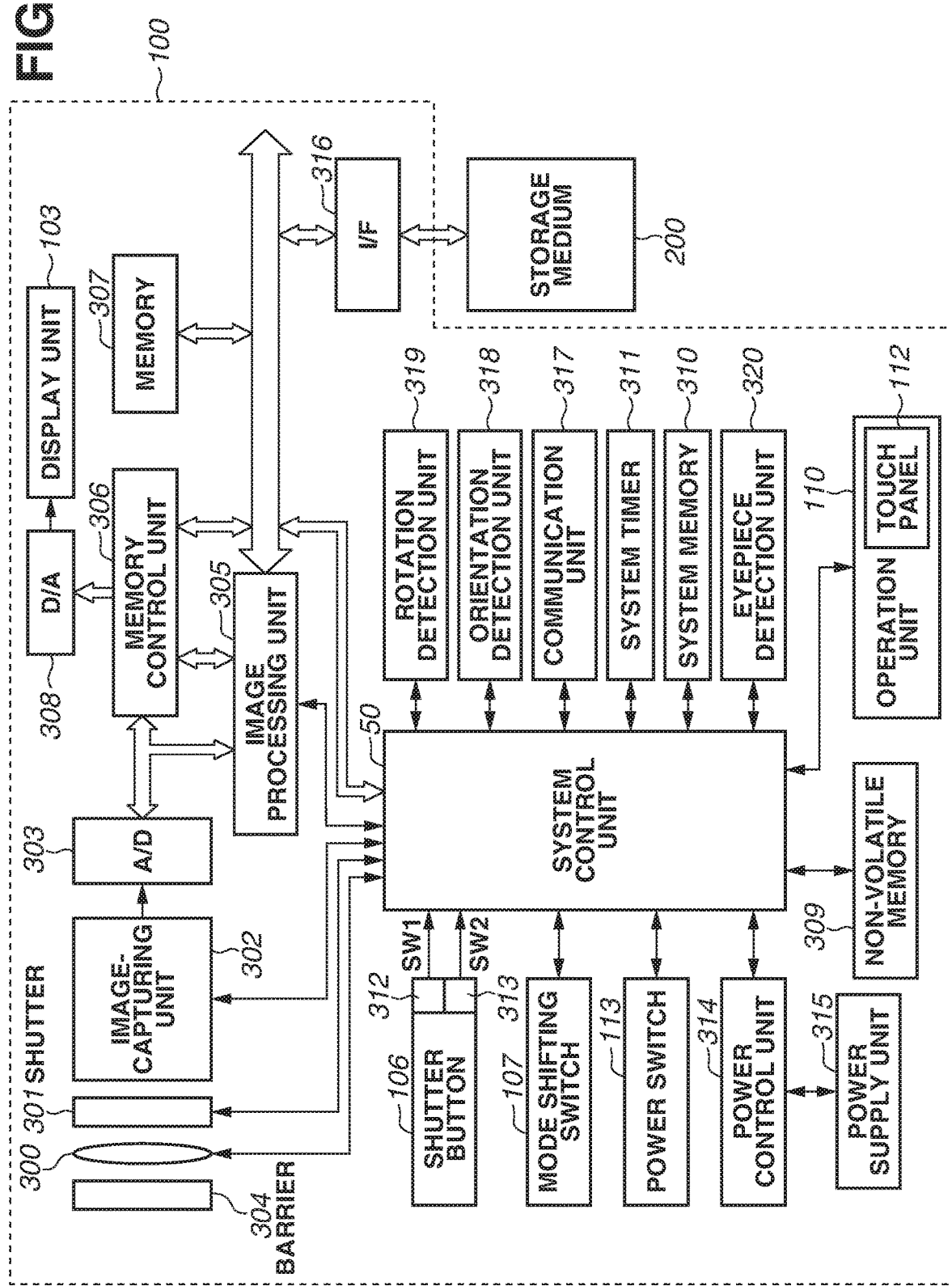
FIG. 3 is a block diagram illustrating an example of an internal configuration of the camera.

FIG. 3 is a block diagram illustrating an example of an internal configuration of the camera 100. The same reference numeral is applied to a configuration similar to the configuration in FIG. 1, and description thereof will be omitted as appropriate.

An imaging lens 300 is a lens group including a zoom lens and a focus lens. A shutter 301 includes an aperture mechanism. An image-capturing unit 302 is an image sensor configured of a charge coupled device (CCD) sensor or a complementary metal-oxide semiconductor (CMOS) sensor which converts an optical image into an electric signal. The image-capturing unit 302 is an example of an image-capturing unit. An analog-to-digital (A/D) conversion unit 303 converts an analog signal output from the image-capturing unit 302 into a digital signal. A barrier 304 covers an image-capturing system including the imaging lens 300 of the camera 100 to prevent the image-capturing system including the imaging lens 300, the shutter 301, and the image-capturing unit 302 from being contaminated or damaged.

An image processing unit 305 executes various types of image processing based on control executed by a system control unit 50. In other words, the image processing unit 305 executes predetermined resizing such as pixel interpolation or reduction, and color conversion on image data received from the A/D conversion unit 303 or the memory control unit 306. Further, the image processing unit 305 executes predetermined arithmetic processing by using captured image data, and the system control unit 50 executes exposure control and range-finding control based on the acquired arithmetic result. Through the above-described processing, auto-focus (AF) processing and auto-exposure (AE) processing are executed by a through-the-lens (TTL) method. Further, the image processing unit 305 executes predetermined arithmetic processing by using captured image data and executes auto-white balance (AWB) processing by the TTL method based on the acquired arithmetic result.

The image data received from the A/D conversion unit 303 is written into the memory 307 via the image processing unit 305 and the memory control unit 306 or via the memory control unit 306 directly. The memory 307 stores image data acquired by the image-capturing unit 302 and converted into digital data by the A/D conversion unit 303 and image data to be displayed on the display unit 103. The memory 307 has a memory capacity sufficient for storing a certain number of still images and a certain period of moving images or audio data. The memory 307 also serves as an image display memory (video memory).

A digital-to-analog (D/A) conversion unit 308 converts display image data stored in the memory 307 into an analog signal and supplies the analog signal to the display unit 103. Accordingly, the display image data written in the memory 307 is displayed on the display unit 103 via the D/A conversion unit 308. The display unit 103 displays the data on a display device such as a liquid crystal display (LCD) according to the analog signal transmitted from the D/A conversion unit 308. The data that is once converted into a digital signal by the A/D conversion unit 303 through A/D conversion is stored in the memory 307, converted into an analog signal by the D/A conversion unit 308, and sequentially transferred to the display unit 103. The display unit 103 functions as an electric view finder to display a live view image by displaying the received data.

A non-volatile memory 309 is an electrically erasable/recordable memory. A memory such as an electrically erasable programmable read-only memory (EEPROM) is used as the non-volatile memory 309. The non-volatile memory 309 stores a constant used for an operation of the system control unit 50 and a program. The program refers to a program for executing a flowchart described in the present exemplary embodiment.

The system control unit 50 includes at least one processor (including a circuit), and controls the entirety of the digital camera 100. The system control unit 50 corresponds to an example of a touch detection unit, a control unit, and an execution unit. The system control unit 50 executes a program stored in the non-volatile memory 309 to realize the below-described processing according to the present exemplary embodiment. Further, the system control unit 50 controls the memory 307, the D/A conversion unit 308, and the display unit 103 to execute display control.

For example, a random access memory (RAM) is used as a system memory 310. An operation constant or variable of the system control unit 50 and a program read from the non-volatile memory 309 are loaded on the system memory 310. A system timer 311 is a time measurement unit that measures a time used for various types of control or a time of a built-in clock.

The mode shifting switch 107, the first shutter switch 312, the second shutter switch 313, and the operation unit 110 are operation units which allow the user to input various operation instructions to the system control unit 50.

The mode shifting switch 107 allows the user to shift an operation mode to any one of a still image capturing mode, a moving image capturing mode and a reproduction mode. The system control unit 50 makes a setting of the operation mode shifted by the mode shifting switch 107. An auto-image capturing mode, an auto-scene determination mode, a manual mode, various scene modes in which image-capturing setting is separately executed for respective image-capturing scenes, a program AE mode, a custom mode, a shutter speed priority mode, and an aperture priority mode are included in the still image capturing mode. The user can directly shift a mode to any one of the modes included in the still image capturing mode by the mode shifting switch 107. Alternatively, the user firstly shifts the mode to the still image capturing mode through the mode shifting switch 107, and may shift the mode to any one of the modes included in the still image capturing mode by using another operation member. The moving image capturing mode may similarly include a plurality of modes.

The first shutter switch 312 is turned ON and generates a first shutter switch signal SW1 when a shutter button 106 is operated halfway and brought into a so-called half-pressed state (i.e., an image-capturing preparation instruction). When the first shutter switch signal SW1 is generated, the system control unit 50 starts executing AF processing, AE processing, and AWB processing.

When a shutter button 106 is operated completely and brought into a so-called fully-pressed state (i.e., an image-capturing instruction), the second shutter switch 313 is turned ON and generates a second shutter switch signal SW2. When the second shutter switch signal SW2 is generated, the system control unit 50 starts a series of image-capturing processing such as reading a signal from the image-capturing unit 302 and writing image data into the storage medium 200.

By selecting and operating various function icons displayed on the display unit 103, the user appropriately allocates functions to respective operation members of the operation unit 110 based on a situation, so that the operation members function as various function buttons. An end button, a return button, an image-forwarding button, a jump button, a narrowing-down button, and an attribute-changing button are examples of the function buttons. For example, when a menu button is pressed, a menu screen that enables setting of various items is displayed on the display unit 103. The user can intuitively perform various settings by using the menu screen displayed on the display unit 103, an up/down/right/left four-direction button, and a SET button.

Further, the operation unit 110 includes a touch panel 112. The touch panel 112 can detect a touch with respect to the display unit 103, and can detect a touch operation performed by the user. The touch panel 112 and the display unit 103 can be configured integrally. For example, the touch panel 112 is attached to an upper layer of the display face of the display unit 103 in such a state that light transmittance thereof will not interfere with display of the display unit 103. By associating input coordinates on the touch panel 112 with display coordinates on the display unit 103, it is possible to provide a graphical user interface (GUI) which the user can use as if the user directly operates a screen displayed on the display unit 103. A touch panel of any one of a resistive film type, an electrostatic capacitance type, a surface elastic wave type, an infrared type, an electromagnetic induction type, an image recognition type, and an optical sensor type can be used as the touch panel 112. Any method may be employed to detect the touch, for example, the touch may be detected when the finger or the stylus pen is brought into contact with the touch panel 112 or when the finger or the stylus pen is moved close to the touch panel 112.

The system control unit 50 can detect the following operations with respect to the touch panel 112 or the states of the touch panel 112.

A state where a finger or a stylus pen which has not touched the touch panel 112 newly touches the touch panel 112, i.e., start of a touch (hereinafter, referred to as "Touch-Down").

A state where a finger or a stylus pen keeps touching the touch panel 112 (hereinafter, referred to as "Touch-On").

A state where a finger or a stylus pen moves while touching the touch panel 112 (hereinafter, referred to as "Touch-Move").

A state where a finger or a stylus pen that has touched the touch panel 112 is removed, i.e., end of a touch (hereinafter, referred to as "Touch-Up").

A state where neither a finger nor a stylus pen touches the touch panel 112 (hereinafter, referred to as "Touch-Off").

When the Touch-Down is detected, the Touch-On is also detected simultaneously. Normally, unless the Touch-Up is detected after the Touch-Down, the Touch-On is detected continuously. The Touch-On is also detected when the Touch-Move is detected. Even if the Touch-On is detected, the Touch-Move is not detected if a touched position is not moved. After the Touch-Up of all of touching fingers or a touching stylus pen is detected, the touch panel 112 is brought into a Touch-Off state. Further, "Tap" is detected simultaneously if the Touch-Up is detected within a predetermined time or less after detection of the Touch-Down.

The above-described operations, states, and a coordinate of a position on the touch panel 112 at which the finger or the stylus pen touches are notified to the system control unit 50 through an internal bus. The system control unit 50 determines the operation (touch operation) executed on the touch panel 112 based on the notified information. A direction of the finger or the stylus pen moving on the touch panel 112 can be also determined with respect to the Touch-Move for each of vertical and horizontal components of the touch panel 112 based on a change of the position coordinate. Further, after the Touch-Down has been performed, when the user performs the Touch-Up through the Touch-Move for a certain period on the touch panel 112, an operation for drawing a stroke is detected. The operation for quickly drawing the stroke is referred to as "Flick". In the Flick, the user quickly moves the finger over a certain distance while touching the touch panel 112 and removes the finger continuously. In other words, the Flick is the operation of quickly flicking and sweeping the touch panel 112 with the finger. When the Touch-UP is detected immediately after the Touch-Move of a predetermined distance or more is detected at a predetermined speed or more, the system control unit 50 determines that the Flick has been performed. Further, when the Touch-Move of a predetermined distance or more is detected at a speed less than the predetermined speed, the system control unit 50 determines that "Drag" has been performed. Further, a touch operation of simultaneously touching a plurality of points (e.g., two points) and moving the touched positions close to each other is referred to as "Pinch-In", and a touch operation for moving the touched positions away from each other is referred to as "Pinch-Out". The Pinch-Out and the Pinch-In are collectively referred to as a pinch operation, or simply referred to as "Pinch".

A power control unit 314 is configured of a battery detection circuit, a direct current-to-direct current (DC-DC) converter, and a switching circuit for switching blocks to be energized. The power control unit 314 detects presence or absence of attached batteries, battery types, and a remaining battery capacity. Further, based on the detection result and an instruction from the system control unit 50, the power control unit 314 controls the DC-DC converter to supply voltage to each unit including the storage medium 200 for a desired period. A power source unit 315 is configured of a primary battery (i.e., an alkaline battery or a lithium battery), or a secondary battery (i.e., a nickel-cadmium (NiCd) battery, a nickel-metal hydride (NiMH) battery, or a lithium-ion (Li-ion) battery), and an alternating current (AC) adapter. A storage medium interface (UF) 316 is an interface of the storage medium 200. The storage medium 200 is configured of a semiconductor memory, an optical disk, or a magnetic disk.

A communication unit 317 is connected through a wireless or wired cable, and transmits/receives image and audio data. The communication unit 317 can be also connected to a wireless local area network (LAN) or the internet. The communication unit 317 can transmit an image (including a live view image) captured by the image-capturing unit 302 or an image stored in the storage medium 200, and can receive image data and various types of information from an external apparatus.

An orientation detection unit 318 detects the orientation of the camera 100 with respect to a gravitational direction. Based on the orientation detected by the orientation detection unit 318, it is possible to determine whether the image captured by the image-capturing unit 302 has been captured by the camera 100 held in a horizontal orientation or a vertical orientation. The system control unit 50 can attach orientation information based on the orientation detected by the orientation detection unit 318 to an image file of the image captured by the image-capturing unit 302, and can rotate and store the image. An acceleration sensor or a gyro-sensor can be used as the orientation detection unit 318.

A rotation detection unit 319 detects a rotation angle of the display unit 103 (i.e., monitor 101) with respect to the housing 104. The rotation detection unit 319 transmits the information about the detected rotation angle to the system control unit 50. The rotation detection unit 319 may detect whether the monitor 101 is in the state K1 or K3 illustrated in FIG. 2 and transmit the information about the detected state to the system control unit 50.

An eyepiece detection unit 320 detects the user's eye brought into contact with the main body 102. The eyepiece detection unit 320 transmits the detected information to the system control unit 50.

The camera 100 having the above-described configuration improves operability of the touch operation performed on the display unit 103 by changing a touch sensitive region of a specific item based on a positional relationship of the display unit 103 with the housing 104. Hereinafter, specific processing executed by the system control unit 50 will be described with reference to the flowchart in FIG. 4.

Figure 4:
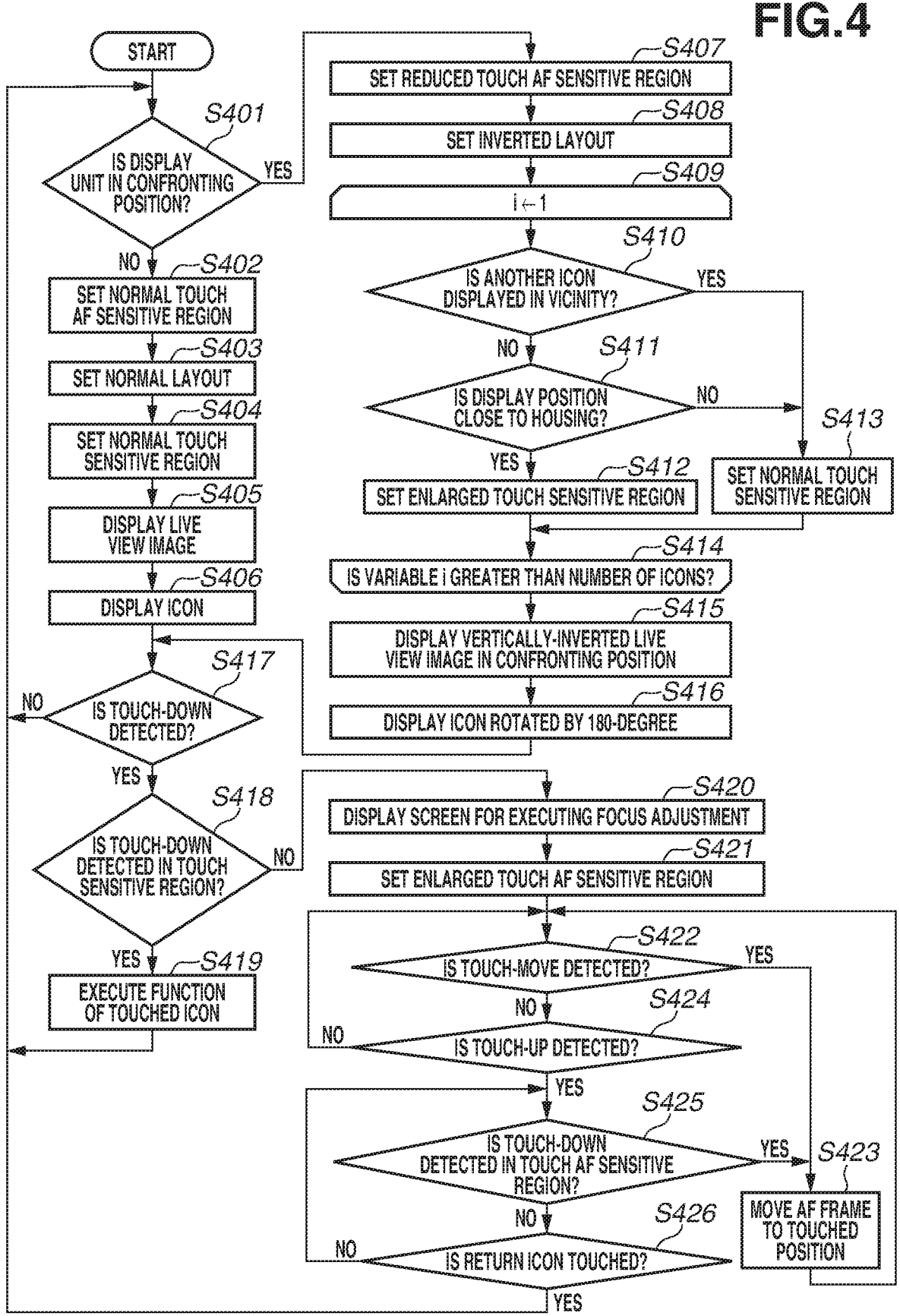
FIG. 4 is a flowchart illustrating an example of processing executed by the camera.

The system control unit 50 loads a program stored in the non-volatile memory 309 onto the system memory 310 to execute the program, so that the flowchart in FIG. 4 is realized. The flowchart in FIG. 4 is started when the operation mode is set to the still image capturing mode or the moving image capturing mode.

In step S401, the system control unit 50 determines whether the display unit 103 is in a confronting position. Specifically, the system control unit 50 receives the information about a rotation angle of the display unit 103 detected by the rotation detection unit 319 and determines that the display unit 103 is in the confronting position if the rotation angle is 180-degree, and determines that the display unit 103 is in the normal position if the rotation angle is 0-degree. If the display unit 103 is in the confronting position (YES in step S401), the processing proceeds to step S407. If the display unit 103 is not in the confronting position but in the normal position (NO in step S401), the processing proceeds to step S402.

The processing in steps S401 to S406 is the processing for displaying a touch icon and a live view image on an image-capturing stand-by screen when the display unit 103 is in the normal position.

In step S402, the system control unit 50 sets a normal touch AF sensitive region to the touch panel 112. In the present exemplary embodiment, in order to set a focus adjustment region based on the position in the live view image touched by the user, the system control unit 50 sets a touch AF sensitive region for receiving a touch operation from the user. The touch AF sensitive region is one example of a position designation region. The normal touch AF sensitive region refers to a touch AF sensitive region to be set when the display unit 103 is in the normal position (i.e., a touch AF sensitive region 504a in FIG. 5B described below).

In step S403, the system control unit 50 sets a normal layout as the layout of touch icons. In the present exemplary embodiment, a touch icon serving as a display item operable through a touch operation is displayed in order to allow the user to change the image-capturing condition while checking the live view image. The normal layout is a layout of touch icons which is set when the display unit 103 is in the normal position (i.e., a layout of touch icons 501a to 501e in FIGS. 5A and 5B described below). In the normal layout, the touch icon is arranged in a direction in which the upper side thereof faces the upper side of the display unit 103 placed in the normal position.

In step S404, the system control unit 50 sets a touch sensitive region of the touch icon to the normal touch sensitive region. The touch sensitive region is a region overlapping with at least a part of the touch icon, where a touch operation performed on the touch icon is detected. The normal touch sensitive region is a region set when the display unit 103 is in the normal position (see touch sensitive regions 502a to 502e in FIG. 5B described below).

In step S405, the system control unit 50 displays a live view image captured by the image-capturing unit 302 on the display unit 103.

In step S406, the system control unit 50 displays the touch icons on the display unit 103 based on the layout set in step S403.

Figure 5A:
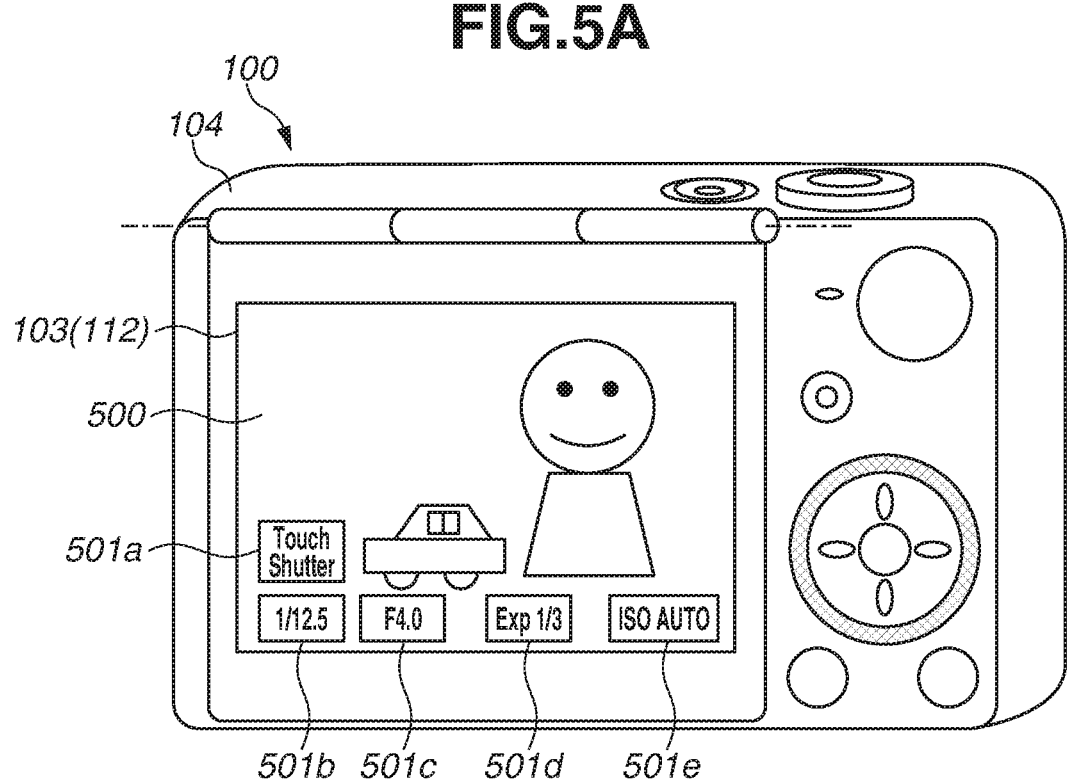
FIGS. 5A and 5B are diagrams illustrating examples of an image-capturing stand-by screen displayed when the display unit is in a normal position.
Figure 5B:
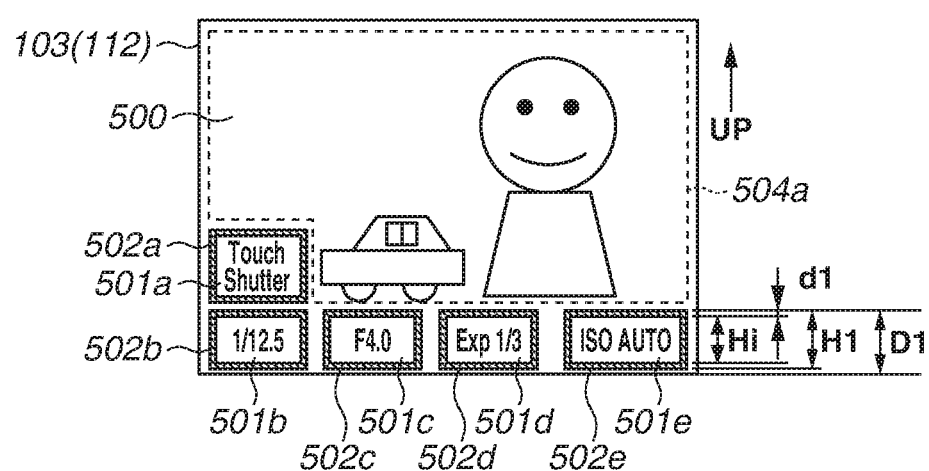

FIGS. 5A and 5B are diagrams illustrating examples of the image-capturing stand-by screen when the display unit 103 is in the normal position.

FIG. 5A is a diagram illustrating an example of the image-capturing stand-by screen displayed on the display unit 103 after the processing in step S406 is completed.

A live view image 500 and touch icons 501a to 501e are displayed on the image-capturing stand-by screen in FIG. 5A. The touch icons 501a to 501e are superimposed on the live view image 500, and the user can change the image-capturing condition by touching the touch icons 501a to 501e.

In the image-capturing stand-by screen in FIG. 5A, the touch icons 501a to 501e are arranged based on the normal layout set thereto. The touch icons 501a to 501e are arranged close, proximal, or within a predetermined distance to the lower portion of the display unit 103. In the present exemplary embodiment, the touch icons 501a and 501b are closely arranged one above the other, and the touch icons 501b to 501e are horizontally arranged side by side.

The touch icon 501a is a display item that receives an instruction for switching the ON/OFF state of the touch shutter function. The touch shutter function gives a still image capturing instruction through a touch operation. The touch icon 501b is a display icon for receiving an instruction for changing a setting value of the shutter speed. The touch icon 501c is a display item for receiving an instruction for changing a setting value of the aperture. The touch icon 501d is a display item for receiving an instruction for changing a setting value of the exposure correction. The touch icon 501e is a display item for receiving an instruction for changing a setting value of the ISO sensitivity.

FIG. 5B is a diagram illustrating an example of a state where the normal touch sensitive region set to the display unit 103 is visualized. In FIG. 5B, an upper side of the display unit 103 in the normal position is indicated by an arrow. Herein, touch sensitive regions 502a to 502e and a touch AF sensitive region 504a are set to the display unit 103.

The touch sensitive regions 502a to 502e are set to be wider than the touch icons 501a to 501e, and respectively overlap with the regions of the touch icons 501a to 501e. When the user touches any one of the touch sensitive regions 502a to 502e, the system control unit 50 detects the touch operation performed on any one of the touch icons 501a to 501e corresponding to the touched touch sensitive region.

The touch sensitive region will be described by taking the touch sensitive region 502e as an example.

The touch sensitive region 502e is set in a range overlapping with the touch icon 501e. As illustrated in FIG. 5B, a height of the touch icon 501e is expressed as "Hi", whereas a height of the touch sensitive region 502e is expressed as "H1". Further, a distance between the upper edge of the touch icon 501e and the upper edge of the touch sensitive region 502e is expressed as "d1". Furthermore, a distance from the lower edge of the display unit 103 to the upper edge of the touch sensitive region 502e is expressed as "D1".

The touch AF sensitive region 504a is set on the live view image 500 excluding the touch sensitive regions 502a to 502e, and is adjacent to the touch sensitive regions 502a to 502e. In FIG. 5B, since the touch icon 501a is arranged on the upper side of the touch icon 501b, the touch AF sensitive region 504a has a rectangular shape having a cutout corner portion. Therefore, the touch AF sensitive region 504a does not overlap with the touch sensitive region 502a. In a case where the touch icon 501a is not arranged thereon, a rectangular-shaped touch AF sensitive region 504a can be set.

As described above, when the display unit 103 is in the normal position, each of the touch sensitive regions 502a to 502e is set to be a minimum region. In other words, the touch AF sensitive region 504a can be set to be wider. Accordingly, in a case where the user touches the outer side of the touch icon, a function corresponding to a touched position on the live view image is executed instead of a function corresponding to the touch icon, which is, in the present exemplary embodiment, the processing for setting a focus adjustment region based on the touched position.

Referring back to FIG. 4, in the processing in steps S407 to S416, a touch icon and a live view image are displayed on the image-capturing stand-by screen when the display unit 103 is in the confronting position.

In step S407, the system control unit 50 sets a reduced touch AF sensitive region to the display unit 103. The reduced touch AF sensitive region has a narrower range in comparison to the case where the display unit 103 is in the normal position (i.e., a touch AF sensitive region 504b in FIG. 6B described below).

Figure 6A:
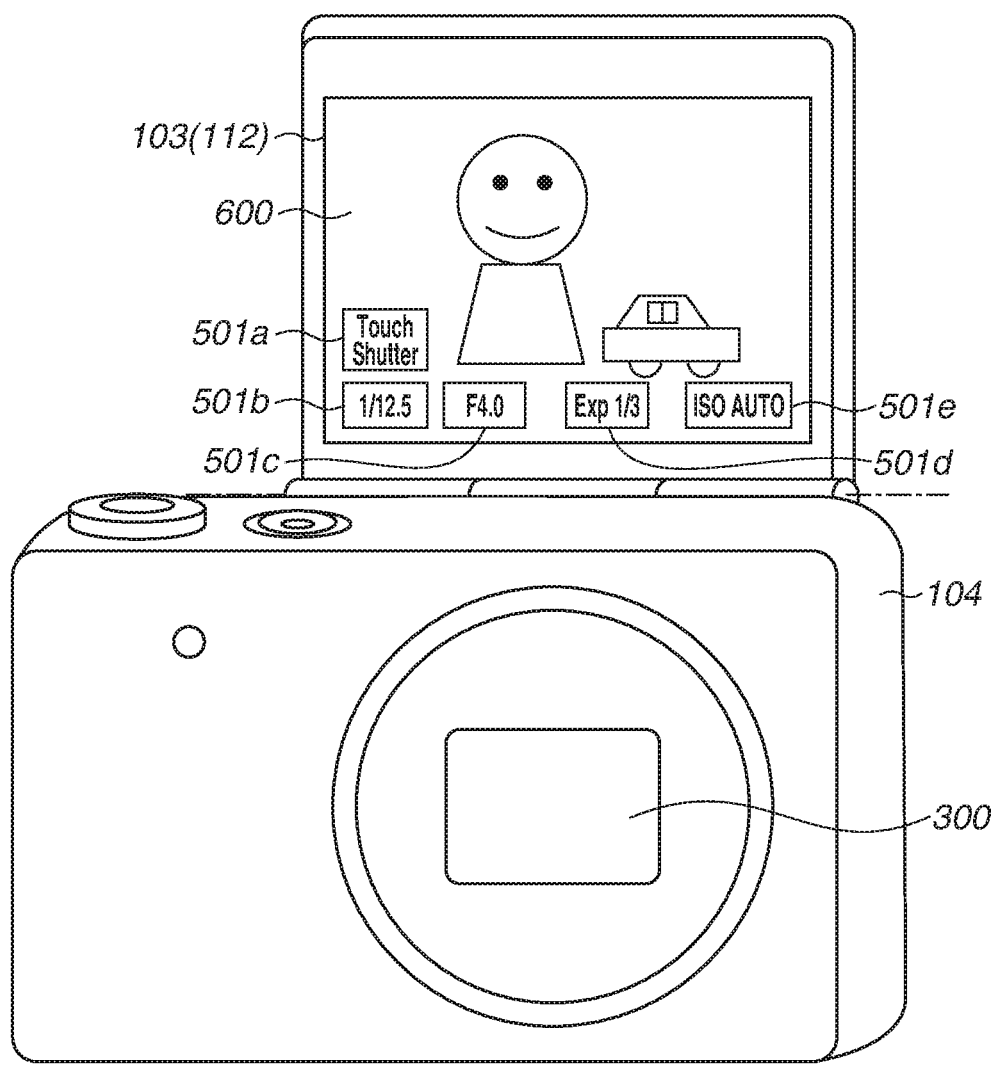
FIGS. 6A and 6B are diagrams illustrating examples of an image-capturing stand-by screen displayed when the display unit is in a confronting position.
Figure 6B:
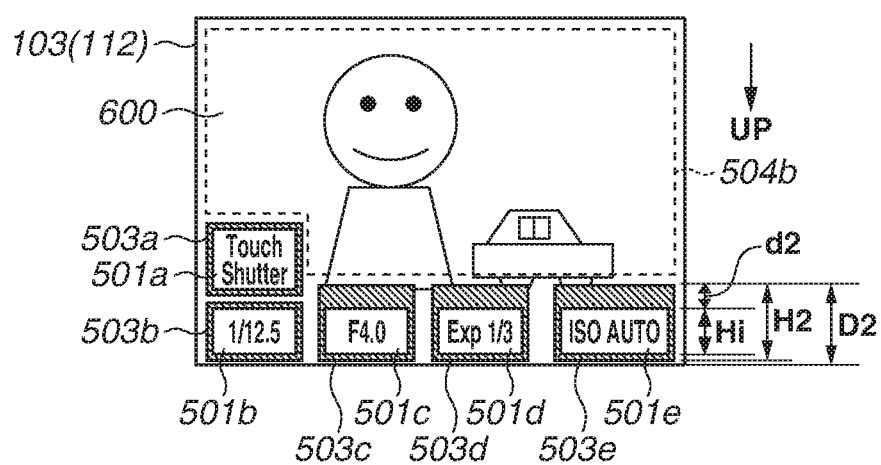

In step S408, the system control unit 50 sets an inverted layout as the layout of touch icons. In the inverted layout, the touch icons 501a to 501e in FIGS. 6A and 6B are rotated by 180 degrees as described below from the layout set when the display unit 103 is in the normal position (i.e., normal layout). In the inverted layout, the touch icon is arranged in a direction in which the upper side thereof faces the upper side of the display unit 103 in the confronting position (i.e., the lower side of the display unit 103 in the normal position). In the inverted layout, the entire image except for the live view image is simply rotated by 180 degrees from a state of the image displayed on the display unit 103 in the normal position.

Accordingly, a position of each of the icons displayed on the display unit 103 in the confronting position is the same as a display position thereof in the normal position when viewed from the user. As performed in the conventional technique, if a positional relationship between objects is changed in order to display the objects at positions where the user can easily perform touch operation, operability may be deteriorated because the touch icons are displayed at positions different from positions expected by the user. In the present exemplary embodiment, even in a case where the display unit 103 is rotated and the photographer views the display unit 103 in a confronting direction, the touch icons are displayed at the positions same as those in the normal position. Therefore, the user can operate the touch icon similarly to the case of the normal position. In the present exemplary embodiment, the same display position includes a position which the user recognizes as the same position.

In steps S409 to S414, the system control unit 50 executes processing for setting the touch sensitive region for each of the touch icons.

In step S409, the system control unit 50 adds one to a variable i of the touch icon and determines a target touch icon for setting a touch sensitive region.

In step S410, the system control unit 50 determines whether another icon is displayed in a vicinity of the target touch icon, i.e., whether another icon is arranged within a predetermined range from a display area of the target icon. If another icon is not displayed in the vicinity of the target icon (NO in step S410), the processing proceeds to step S411. If another icon is displayed in the vicinity thereof (YES in step S410), the processing proceeds to step S413.

In the present exemplary embodiment, the system control unit 50 determines whether another icon is arranged within a predetermined distance (first distance) from an edge portion (upper/lower edge) of the display area of the target touch icon in a direction orthogonal to the rotation axis (herein, upper/lower direction) from among face directions of the display face. In other words, the system control unit 50 determines whether another icon is arranged within the first distance from the edge portion of the display area of the target touch icon in a direction opposite to or close, proximal, or within a predetermined distance to the housing 104. For example, the above determination can be made based on layout information about the touch icon previously stored in the non-volatile memory 309 or information indicating whether another touch icon is displayed, previously stored in association with identification information about each touch icon. Further, a value of the first distance is a value of the height Hi of the touch icon 501e or less, previously stored, for example, in the non-volatile memory 309.

On the other hand, determination is not made on whether another touch icon is arranged within the first distance from the display area of the target touch icon in a direction (herein, right/left direction) orthogonal to the direction opposite to or close, proximal, or within a predetermined distance to the housing 104. Accordingly, even if another touch icon is arranged within the first distance from the display area of the target touch icon in the left/right direction, the system control unit 50 determines that another icon is not displayed in a vicinity thereof unless another icon is arranged within the first distance in the upper/lower direction.

In step S411, the system control unit 50 determines whether the target touch icon is arranged in a vicinity of the housing 104.

In the present exemplary embodiment, the system control unit 50 determines whether the edge portion of the display unit 103 (i.e., the lower edge in the confronting position) exists within a predetermined distance (a second distance) from the edge portion (i.e., the lower edge in the confronting position) of the display area of the target touch icon in a direction (i.e., a lower direction in the confronting position) orthogonal to the rotation axis from among the face directions of the display face. The above determination can be made based on, for example, layout information of the touch icon previously stored in the non-volatile memory 309 or information indicating whether the touch icon is arranged in a vicinity of the housing 104, previously stored in association with identification information about each touch icon. In addition, a value of the second distance is a value of the height Hi of the touch icon 501e or less, previously stored, for example, in the non-volatile memory 309.

If the target touch icon is arranged in the vicinity of the housing 104 (YES in step S411) the processing proceeds to step S412. If the target touch icon is not arranged in the vicinity of the housing 104 (NO in step S411), the processing proceeds to step S413.

In step S412, the system control unit 50 sets an enlarged touch sensitive region as the touch sensitive region of the target touch icon. The enlarged touch sensitive region is a region which is wider than the touch sensitive region set when the display unit 103 is in the normal position. More specifically, the enlarged touch sensitive region is a region, which is wider than the normal touch sensitive region on a side opposite to the housing 104 (i.e., the upper side in the confronting position), such as the below-described touch sensitive regions 503c to 503e in FIG. 6B.

On the other hand, if the system control unit 50 determines that another touch icon is displayed in the vicinity of the target touch icon in step S410, or if the system control unit 50 determines that the target touch icon is not arranged in the vicinity of the housing 104 in step S411, the processing proceeds to step S413.

In step S413, the system control unit 50 does not enlarge the touch sensitive region of the target touch icon and sets the normal touch sensitive region. In other words, the system control unit 50 sets the touch sensitive region substantially the same as the touch sensitive region set when the display unit 103 is in the normal position, instead of setting the touch sensitive region that is wider on the side opposite to the housing 104 than in the normal position.

In step S414, the system control unit 50 determines whether the variable i exceeds the number of touch icons, i.e., whether the processing in steps S410 to S413 is completed with respect to all of the touch icons. If the processing is completed, the processing proceeds to step S415. If the processing has not been completed, the processing returns to step S410 to process all of the touch icons.

In step S415, the system control unit 50 displays the live view image captured by the image-capturing unit 302, which is vertically inverted from the state where the display unit 103 is in the normal position. Herein, the live view image is only vertically inverted without being rotated by 180-degree (i.e., without being inverted both vertically and horizontally). Accordingly, the live view image is displayed in an orientation in which the live view image is mirror-inverted (into a mirrored image), from a state of the live view image displayed when the display unit 103 is in the normal position, when the user views the display unit 103 from the object side. Thus, since the live view image is displayed in the mirror-inverted orientation, a user who is visually checking the live view image from the object side, can easily decide the user's own pose captured in the live view image.

In step S416, the system control unit 50 displays the touch icons on the display unit 103 based on the layout set in step S408. In other words, the system control unit 50 displays the touch icons on the display unit 103 in a layout inverted by 180-degree from the layout (normal layout) when the display unit 103 is in the normal position.

FIGS. 6A and 6B are diagrams illustrating examples of the image-capturing stand-by screen displayed when the display unit 103 is in the inverted position.

FIG. 6A is a diagram illustrating an example of the image-capturing stand-by screen displayed on the display unit 103 after the processing in step S416 is completed.

A live view image 600 and touch icons 501a to 501e are displayed on the image-capturing stand-by screen in FIG. 6A. At this time, touch icons 501a to 501e are displayed in a region of side close to the housing 104 in the display unit 103. In other words, touch icons 501a to 501e are displayed in a region closer to the housing 104 than a center of an entire display area of the display unit 103. The same touch icons are displayed in FIGS. 6A and 5A, so that the same reference numerals are applied thereto.

In the image-capturing stand-by screen in FIG. 6A, the live view image 600 is displayed in an orientation in which the live view image 500 in FIG. 5A is mirror-inverted.

Further, the touch icons 501a to 501e are arranged based on the set inverted layout. Therefore, since the touch icons 501a to 501e in FIG. 6A are displayed in the positions same as the positions of the touch icons 501a to 501e in FIG. 5A, the user can operate in a same way as in a case where the display unit 103 is in the normal position.

FIG. 6B is a diagram illustrating an example of a state where the enlarged touch sensitive region set to the display unit 103 is visualized. In FIG. 6B, an upper side of the display unit 103 in the normal position is indicated by an arrow. Herein, touch sensitive regions 503a to 503e and a touch AF sensitive region 504b are set.

The touch sensitive regions 503a to 503e are set to be wider than the touch icons 501a to 501e, and respectively overlap with the regions of the touch icons 501a to 501e.

Herein, of the touch sensitive regions 503a to 503e, the touch sensitive regions 503c, 503d, and 503e are wider than the touch sensitive regions 502c, 502d, and 502e in FIG. 5B set when the display unit 103 is in the normal position. Specifically, each of the touch sensitive regions 503e, 503d, and 503e is wider on the side opposite to the housing 104 than each of the touch sensitive regions 502c, 502d, and 502e in FIG. 5B set when the display unit 103 is in the normal position. In other words, each of the touch sensitive regions 503c, 503d, and 503e is enlarged on the upper side of the display unit 103 in the case of the confronting position (i.e., the lower side of the display unit 103 in the normal position). The touch sensitive regions 503c, 503d, and 503e are enlarged in the above-described state because corresponding touch icons 501c, 501d, and 501e satisfy the conditions that another icon is not displayed in the vicinity (NO in step S410) and that the touch icons 501c, 501d, and 501e are arranged in the vicinity of the housing 104 (YES in step S411). Therefore, the processing proceeds to step S412 from step S411, and the enlarged touch sensitive region is set as the touch sensitive regions 503c, 503d, and 503e.

The touch sensitive region will be described by taking the touch sensitive region 503e as an example.

The touch sensitive region 503e is set to be wider than the touch sensitive region 502e in FIG. 5B on a side opposite to the housing 104. As illustrated in FIG. 6B, a height of the touch icon 501e is expressed as "Hi", and a height of the touch sensitive region 503e is expressed as "H2". Further, a distance between the upper edge of the touch icon 501e and the upper edge of the touch sensitive region 503e is expressed as "d2". Furthermore, a distance from the lower edge of the display unit 103 (i.e., the upper edge in the normal position) to the upper edge of the touch sensitive region 503e is expressed as "D2".

The touch sensitive region 502e in FIG. 5B and the touch sensitive region 503e in FIG. 6B are compared to each other. In FIGS. 5B and 6B, the touch icon 501e is displayed in the same position with the same height Hi.

A relationship between the height H1 of the touch sensitive region 502e and the height H2 of the touch sensitive region 503e can be expressed as "H1<H2". Further, a relationship between the distance d1 between the upper edge of the touch icon 501e and the upper edge of the touch sensitive region 502e and the distance d2 between the upper edge of the touch icon 501e and the upper edge of the touch sensitive region 503e can be expressed as "d1<d2". Furthermore, a relationship between the distance D1 between the lower edge of the display unit 103 and the upper edge of the touch sensitive region 502e and the distance D2 between the lower edge of the display unit 103 (i.e., the upper edge in the normal position) and the upper edge of the touch sensitive region 503e can be expressed as "D1<D2".

As described above, the touch sensitive region 503e set when the display unit 103 is in the confronting position is wider on the side opposite to the housing 104 than the touch sensitive region 502e set when the display unit 103 is in the normal position. Further, the touch sensitive regions 503c and 503d are set similarly to the touch sensitive region 503e.

On the other hand, of the touch sensitive regions 503a to 503e, the touch sensitive regions 503a and 503b are identical to the touch sensitive regions 502a and 502b in FIG. 5B set when the display unit 103 is in the normal position. The respective touch sensitive regions 503a and 503b are identical because corresponding touch icons 501a and 501b satisfy the condition that another touch icon is displayed in the vicinity (YES in step S410), so that the normal touch sensitive regions are set.

The touch AF sensitive region 504b is set on the live view image 600 excluding the touch sensitive regions 503a to 503e, and is adjacent to the touch sensitive regions 503a to 503e. In FIG. 6B, the touch sensitive regions 503c to 503e are wider than those illustrated in FIG. 5B, so that the touch AF sensitive region 504b is reduced and set to prevent overlapping with the touch sensitive regions 503c to 503e. In addition, since the touch sensitive region 503a is not enlarged, a region on the upper side of the touch sensitive region 503a among the touch AF sensitive region 504b is not reduced to be smaller than the region illustrated in FIG. 5B.

Thus, in a case where the display unit 103 is in the confronting position, the touch sensitive region of the touch icon is enlarged. Accordingly, even in a case where the user cannot easily perform the touch operation because the touch icon is arranged at a position where the user's finger interferes with the housing 104, operability of the touch operation with respect to the display unit 103 can be improved by enlarging the touch sensitive region thereof. Further, since the touch sensitive region is enlarged by handling only a touch icon arranged in the vicinity of the housing 104 which does not have another touch icon in its vicinity as a target, reduction in size of the touch AF sensitive region can be minimized. Furthermore, because the position of the touch icon displayed on the display unit 103 in the inverted position is the same as the position of the touch icon displayed on the display unit 103 in the normal position, user's operability of the touch operation with respect to the touch icon can be improved.

The processing in step S417 and subsequent steps will be described with reference to the flowchart in FIG. 4 again.

In step S417, the system control unit 50 determines whether Touch-Down performed on the display unit 103 is detected. If the Touch-Down is detected (YES in step S417) the processing proceeds to step S418. If the Touch-Down is not detected (NO in step S417), the processing returns to step S401.

In step S418, the system control unit 50 determines whether a position of the Touch-Down is in a touch sensitive region corresponding to the touch icon. If the position of Touch-Down is in the touch sensitive region corresponding to the touch icon (YES in step S418), the processing proceeds to step S419. If the position of Touch-Down is not in the touch sensitive region corresponding to the touch icon (NO in step S418), the processing proceeds to step S420.

In step S419, the system control unit 50 executes the function according to the touch icon corresponding to the touch sensitive region.

Figure 7:
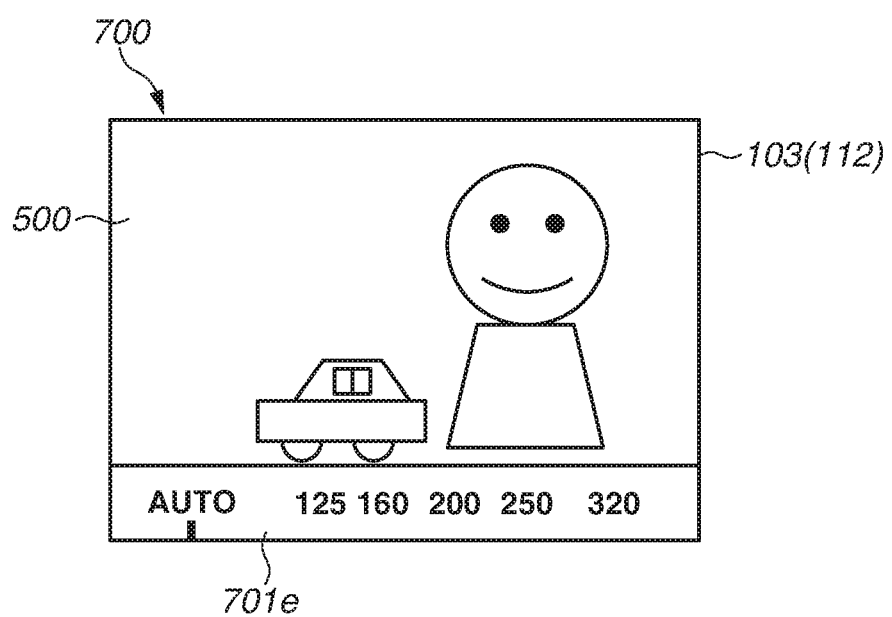
FIG. 7 is a diagram illustrating an example of a screen for setting sensitivity compliant with a standard of the International Standards Organization (ISO).

FIG. 7 is a diagram illustrating an example of a shifted and displayed screen when the Touch-Down is performed in the touch sensitive region 502e of the touch icon 501e in the image-capturing stand-by screen in FIG. 5A.

The live view image 500 illustrated in FIG. 5A and a setting item 701e are displayed on the shifted screen 700. Since the touch icon 501e is an icon for receiving an instruction for changing a setting value of the ISO sensitivity, the setting value of the ISO sensitivity is displayed on the setting item 701e. The system control unit 50 sets the setting value corresponding to the setting item 701e touched by the user as the ISO sensitivity. While the shifted screen 700 displayed when the touch icon 501a is touched has been described herein, the exemplary embodiment is not limited thereto, and corresponding functions are also executed with respect to the touch icons 501a to 501d. Further, the live view image 600 illustrated in FIG. 6A is displayed if the Touch-Down is performed in the touch sensitive region 503e of the touch icon 501e in the image-capturing stand-by screen illustrated in FIG. 6A. Thereafter, the processing returns to step S401.

In step S420, the system control unit 50 shifts the screen to a screen which allows the user to execute focus adjustment based on the position touched in the touch AF sensitive region. At this time, the system control unit 50 hides the touch icons which have been displayed and displays a new touch icon.

In step S421, the system control unit 50 cancels the setting of the touch sensitive region corresponding to the hidden touch icon and sets a touch sensitive region corresponding to the newly displayed touch icon. Further, the system control unit 50 sets an enlarged touch AF sensitive region. The enlarged touch AF sensitive region is wider than the touch AF sensitive region set when the display unit 103 is in the normal position, and is also wider than the touch AF sensitive region set when the display unit 103 is in the confronting position.

Figure 8A:
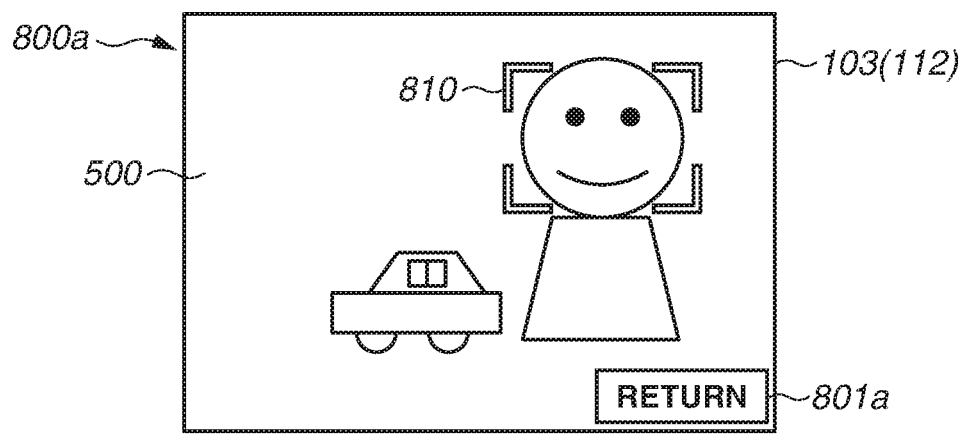
FIGS. 8A to 8C are diagrams illustrating examples of a screen for setting a position where focus adjustment is to be executed.

FIG. 8A is a diagram illustrating an example of a shifted screen 800a when the Touch-Down is performed on an object captured in the live view image 500, in this case a face of a person, in the touch AF sensitive region 504a in FIG. 5B in a case where a face tracking priority AF mode is set as an AF method.

The live view image 500 illustrated in FIG. 5A, a return icon 801a, and a face tracking frame 810 are displayed on the shifted screen 800a. The user touches the return icon 801a to return the shifted screen to the previous screen. The face tracking frame 810 is a display item which makes the user recognize that the person's face is being tracked. The face tracking frame 810 is displayed to follow the movement of the person's face.

If the Touch-Down is performed on the touch AF sensitive region 504b in FIG. 6B, the live view image 600 illustrated in FIG. 6A is displayed. Herein, settings of the touch sensitive regions 502a to 502e or 503a to 503e corresponding to the touch icons 501a to 501e are cancelled.

Figure 8B:
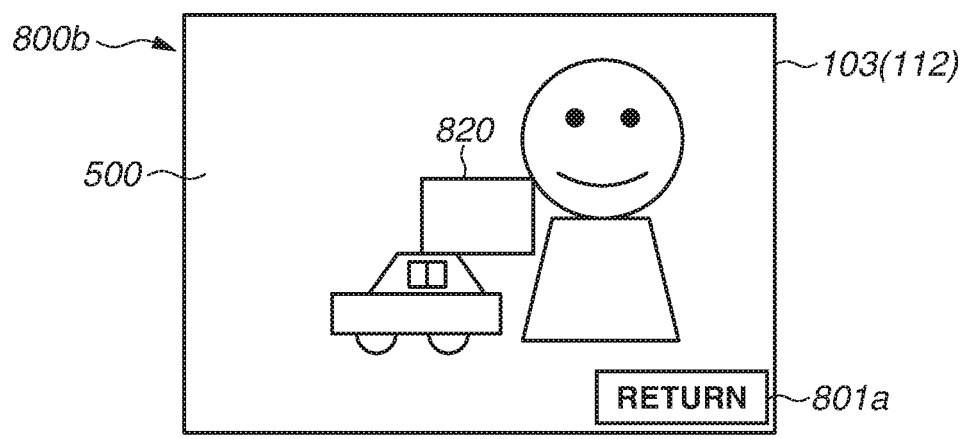

FIG. 8B is a diagram illustrating an example of a shifted screen 800b which is displayed in a case where the Touch-Down is performed on the touch AF sensitive region 504a in FIG. 5B in a case where a one-point AF mode is set as the AF method.

The live view image 500 illustrated in FIG. 5A, the return icon 801a, and a one-point AF frame 820 are displayed on the shifted screen 800b. The one-point AF frame 820 is a display item which makes the user recognize a position where focus adjustment is executed.

In addition, the live view image 600 in FIG. 6A is displayed in a case where Touch-Down is performed on the touch AF sensitive region 504b in FIG. 6B. In the shifted screen 800b, settings of the touch sensitive regions 502a to 502e or 503a to 503e corresponding to the touch icons 501a to 501e are cancelled.

Figure 8C:
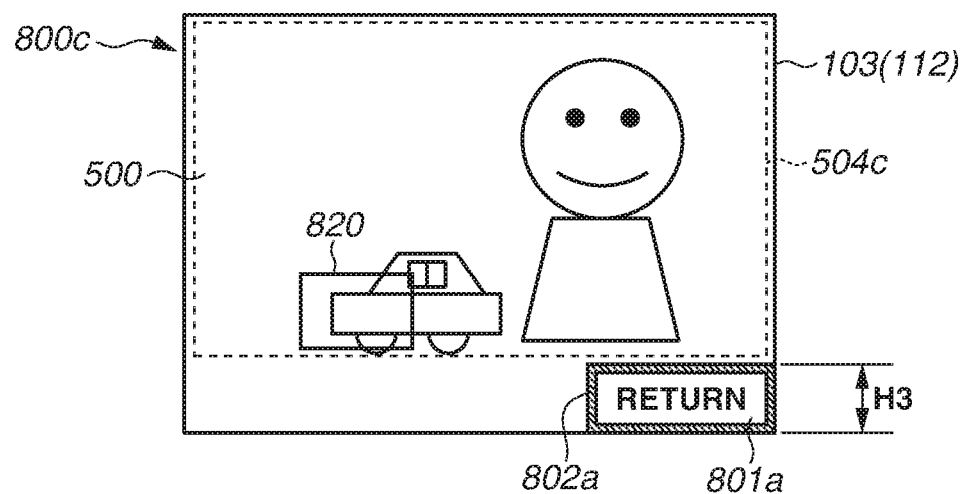

FIG. 8C is a diagram illustrating an example of a state where the enlarged touch sensitive region set to the display unit 103 is visualized. In FIG. 8C, a touch sensitive region 802a corresponding to the return icon 801a and the touch AF sensitive region 504c are set.

The touch sensitive region 802a overlaps with the region of the return icon 801a and is set to be wider than the return icon 801a. When the height of the touch sensitive region 802a is expressed as "H3", a relationship between the height H3 and the height H2 of the touch sensitive region 503e in FIG. 6B can be expressed as "H3<H2".

The touch AF sensitive region 504c is set on the live view image 500 or 600 excluding the touch sensitive region 802a. In FIG. 8C, because the height H3 of the touch sensitive region 802a is reduced to be lower than the height H2 of the touch sensitive region 503e, the touch AF sensitive region 504c is enlarged to be larger than the touch AF sensitive region 504b in FIG. 6B.

Further, because the settings of the touch sensitive regions 502a to 502e, or 503a to 503e are cancelled, the touch AF sensitive region 504c is enlarged to be larger than the touch AF sensitive region 504a in FIG. 5B or the touch AF sensitive region 504b in FIG. 6B. Herein, the touch AF sensitive region 504c is enlarged to a range where the touch AF sensitive region 504c overlaps with a part of the touch sensitive regions 503a to 503e in FIG. 6B. Specifically, the touch AF sensitive region 504c is enlarged up to tires of a vehicle in the live view image 500. Accordingly, although the tires of the vehicle cannot be specified as the focus adjustment position with the touch AF sensitive region 504b as it is in FIG. 6B, the user can specify the tires of the vehicle as the focus adjustment position by enlarging the touch AF sensitive region 504c as illustrated in FIG. 8C.

The processing in step S422 and subsequent steps will be described with reference to the flowchart in FIG. 4 again.

In step S422, the system control unit 50 determines whether Touch-Move is detected in a state where Touch-Down is performed on the touch AF sensitive region. If the Touch-Move is detected (YES in step S422), the processing proceeds to step S423. If the Touch-Move is not detected (NO in step S422), the processing proceeds to step S424.

In step S423, the system control unit 50 moves the AF frame to a position where the Touch-Move is performed, and displays the AF frame. Accordingly, for example, a one-point AF frame 820 is moved to a position illustrated in FIG. 8C from a position illustrated in FIG. 8B. Because the touch AF sensitive region is enlarged, the AF frame can be moved in a wider range.

In step S424, the system control unit 50 determines whether Touch-Up is detected. If the Touch-Up is detected (YES in step S424), the processing proceeds to step S425. If Touch-Up is not detected (NO in step S424), the processing returns to step S422.

In step S425, the system control unit 50 determines whether the Touch-Down is detected in the touch AF sensitive region. If the Touch-Down is detected in the touch AF sensitive region (YES in step S425) the processing proceeds to step S423. If the Touch-Down is not detected in the touch AF sensitive region (NO in step S425) the processing proceeds to step S426.

In step S426, the system control unit 50 determines whether touch operation with respect to the return icon 801a is detected. If the touch operation with respect to the return icon 801a is detected (YES in step S426), the processing returns to step S401, and the above-described processing in step S401 and subsequent steps is repeated. If the touch operation with respect to the return icon 801a is not detected (NO in step S426), the processing returns to step S425.

When the display unit 103 is in the confronting position as illustrated in FIG. 6B, the touch sensitive regions 503c, 503d, and 503e of the touch icons 501c, 501d, and 501e are wider than the touch sensitive regions 503a and 503b of the touch icons 501a and 501b. Because of the above-described difference in size of the touch sensitive regions, the touch icons 501a and 501b exist within a predetermined distance in the upper/lower direction, and satisfy the condition that another touch icon is displayed in the vicinity in step S410.

The touch icons displayed on the positions of the touch icons 501c, 501d, and 501e can be operated easier than the touch icons displayed on the positions of the touch icons 501a and 501b. Accordingly, it is preferable that touch icons having more important functions be allocated to the touch icons 501c, 501d, and 501e instead of allocated to the touch icons 501a and 501b. In a case where the important function is different in each mode, arrangement of the touch icons is changed based on a set operation mode, so that the touch icons having functions important in that set operation mode are arranged at the positions of the touch icons 501c, 501d, and 501e. On the other hand, it is preferable that the touch icons having less important functions be arranged at the positions of the touch icons 501a and 501b.

The present exemplary embodiment will be described by taking a shutter speed priority mode and an aperture priority mode as examples.

In the shutter speed priority mode, a shutter speed is set by the user, and an aperture is automatically determined based on the set shutter speed. The shutter speed priority mode corresponds to an example of the first operation mode.

In the aperture priority mode, a setting value of an aperture is set by the user, and a shutter speed is automatically determined based on the setting value of the aperture. The aperture priority mode corresponds to an example of the second operation mode.

In the shutter speed priority mode, a touch icon for receiving an instruction for changing the shutter speed is arranged at any one of the positions of the touch icons 501c, 501d, and 501e. On the other hand, a touch icon for receiving an instruction for changing a setting value of the aperture and a touch icon for receiving an instruction for shifting ON/OFF of the touch shutter function according to a touch operation are arranged at the positions of the touch icons 501a and 501b.

In the aperture priority mode, the touch icon for receiving an instruction for changing a setting value of the aperture is arranged at any one of the positions of the touch icons 501c, 501d, and 501e. On the other hand, the touch icon for receiving an instruction for changing the setting value of the shutter speed and the touch icon for receiving an instruction for shifting ON/OFF of the touch shutter function according to a touch operation are arranged at the positions of the touch icons 501a and 501b. FIGS. 5A and 6A illustrate examples of the screens displayed when the operation mode is set to the aperture priority mode. The touch icon for receiving an instruction of changing the setting value of the aperture is set to the touch icon 501c. Further, the touch icon for receiving an instruction of changing ON/OFF of the touch shutter function is set to the touch icon 501a. Furthermore, the touch icon for receiving an instruction of changing the shutter speed is set to the touch icon 501b.

Thus, by allocating the touch icon having an important function to the touch icon that has a wider touch sensitive region when the display unit 103 is in the confronting position, operability of the touch operation can be further improved. Further, in a case where the important function is different in the operation mode, the touch icon having a function important in the set operation mode is allocated to the touch icon that has a wider touch sensitive region when the display unit 103 is in the confronting position. By allocating the touch icon as described above, operability of the touch operation can be further improved.

While the present disclosure has been described with reference to the various exemplary embodiments, the present disclosure is not limited to the above-described exemplary embodiments, and can be changed within the scope of the present disclosure. Further, the above-described exemplary embodiments may be combined as appropriate.

In the above-described exemplary embodiments, the touch sensitive region is set to overlap with a region of the touch icon. However, the configuration is not limited thereto, and the touch sensitive region may be set so that at least a part of the touch sensitive region overlaps with a region of the touch icon.

Further, in the above-described exemplary embodiments, as illustrated in FIG. 1, the monitor 101 is rotated around the hinge 105 by using the upper side of the rectangle as a rotation axis. However, the configuration is not limited thereto, and the monitor 101 can be rotated by handling any one of the lower side edge, the right side edge, and the left side edge as a rotation axis. Furthermore, the monitor 101 may be a variable angle type monitor.

Further, the various types of the control executed by the system control unit 50 may be executed by a single piece of hardware, or a plurality of pieces of hardware (e.g., a plurality of processors and circuits) may share the processing to control the entirety of the apparatus.

Further, in the above-described exemplary embodiments, while the present disclosure is applied to an image-capturing apparatus, the present exemplary embodiment is not limited thereto. The present disclosure can be applied to any apparatus which can detect a touch operation on a display unit capable of changing a positional relationship with a housing, and can set a touch sensitive region to an icon. In other words, the present disclosure may be applicable to other configurations including, for example, a smartphone, a tablet personal computer (PC), a mobile-type personal computer, a personal digital assistant (PDA), a portable image viewer, a digital photo frame, a music player, a gaming machine, an electronic book reader, or the like.

Further, in the above-described exemplary embodiments, while the present disclosure is applied to an image-capturing apparatus main body, the present exemplary embodiments are not limited thereto. The present disclosure can be also applied to a control apparatus which communicates with an image-capturing apparatus (including a network camera) by cable or wireless to remotely control the image-capturing apparatus. Apparatuses such as a smartphone, a tablet PC, and a desktop PC are examples of such apparatuses that remotely control the image-capturing apparatus. Based on the operation or processing executed on the control apparatus, the control apparatus can remotely control the image-capturing apparatus by transmitting a command for causing the image-capturing apparatus to execute various operations and settings. Further, the control apparatus may display a live view image captured by the image-capturing apparatus by receiving the live view image by cable or wireless.

According to the present disclosure, operability of the touch operation with respect to the display unit can be further improved in a case where a positional relationship between the housing and the display unit is changed.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-056302, filed Mar. 25, 2019, which is hereby incorporated by reference herein in its entirety.

What is claimed is:

1. An electronic apparatus comprising:
a touch detection unit configured to detect a touch operation performed on a display unit capable of changing a positional relationship with a housing;
at least a memory and at least one processor which function as a control unit configured to perform control to display a specific icon and set a first range at least partially overlapping with the specific icon as a touch sensitive region of the specific icon in a case where a positional relationship of the display unit with the housing is a first positional relationship, and to perform control to display the specific icon on a side close to the housing relative to a center of a display area in the display unit and set a second range wider than the first range on a side opposite to the housing, at least partially overlapping with the specific icon, as a touch sensitive region of the specific icon in a case where a positional relationship of the display unit with the housing is a second positional relationship; to change a touch sensitive region of an icon based on a positional relationship of the display unit with the housing, and whether a different icon is displayed within a predetermined range from a display area of the icon; and
an execution unit configured to execute a function corresponding to the specific icon when a touch operation is performed on the touch sensitive region.

2. The electronic apparatus according to claim 1, wherein the control unit performs control to display an image on the display unit, and superimpose and display the specific icon on the image, and
wherein the execution unit executes specific processing corresponding to a touched position on the image based on a touch operation performed on a position designation region adjacent to the touch sensitive region, which is not a touch sensitive region of any icons.

3. The electronic apparatus according to claim 2, wherein the image is a live view image captured by an image-capturing unit, and
wherein the specific processing is processing for setting a focus adjustment region based on a touched position in the live view image.

4. The electronic apparatus according to claim 3, wherein, in a case where the positional relationship is the second positional relationship, the control unit performs control to display the live view image in an orientation in which the live view image is mirror-inverted from a state of the live view image in the first positional relationship when viewed from a user, and display the specific icon in a position and an orientation same as a position and an orientation of the specific icon in the first positional relationship when viewed from the user.

5. The electronic apparatus according to claim 3, wherein, in a case where a positional relationship is the second positional relationship, the control unit performs control to display the live view image in an orientation in which the live view image is vertically inverted from a state of the live view image in the first positional relationship, and display the specific icon by rotating the specific icon by 180 degrees from a state of the specific icon in the first positional relationship.

6. The electronic apparatus according to claim 3, wherein the control unit performs control to hide the specific icon based on a touch operation performed on the position designation region, cancel a setting of the touch sensitive region for the specific icon set to the second range, and set a range at least partially overlapping with the second range as the position designation region.

7. The electronic apparatus according to claim 1, wherein a plurality of icons is displayed on the display unit, and
wherein the control unit performs control to specify an icon at a first position having no different icon displayed within a predetermined range from a display area of the icon, as the specific icon, among the plurality of icons, and performs control to set a touch sensitive region of the icon at the first position such that the touch sensitive region in the second positional relationship becomes wider than a touch sensitive region in the first positional relationship on a side opposite to the housing, and set a touch sensitive region of an icon at a second position having a different icon displayed within the predetermined range from a display area of the icon, among the plurality of icons such that a width of the touch sensitive regions in the first positional relationship and a width of the touch sensitive region in the second positional relationship are the same on the side opposite to the housing.

8. The electronic apparatus according to claim 7, wherein the control unit performs control to specify an icon having no different icon displayed within a first distance from a display area of the icon in a direction opposite to or side close to the housing, as the specific icon, among the plurality of icons.

9. The electronic apparatus according to claim 8, wherein, among the plurality of icons displayed when the positional relationship of the display unit with the housing is the second positional relationship, the control unit performs control to specify an icon with an edge portion of the display unit positioned within a second distance from a display area of the icon in a direction side close to the housing, as the specific icon.

10. The electronic apparatus according to claim 8,
wherein the display unit can change a positional relationship with the housing by rotating around a rotation axis, and
wherein the direction opposite side to or the direction side close to the housing is orthogonal to an axis direction of the rotation axis.

11. The electronic apparatus according to claim 7, wherein, in a case where a different icon is displayed within the first distance from a display area of an icon in a direction orthogonal to a direction opposite side to or a direction side close to the housing, the control unit performs control to specify an icon having no different icon displayed within the first distance from the display area of the icon in a direction opposite side to or a direction side close to the housing, as the specific icon among the plurality of icons.

12. The electronic apparatus according to claim 7, wherein the control unit performs control to display a first icon at the first position in a case where an operation mode is a first operation mode and performs control to display a second icon at the first position without displaying the first icon in a case where an operation mode is a second operation mode.

13. The electronic apparatus according to claim 12,
wherein the first operation mode is a shutter speed priority mode in which a shutter speed is set by a user and an aperture is automatically determined based on the set shutter speed,
wherein the second operation mode is an aperture priority mode in which a setting value of the aperture is set by a user and a shutter speed is automatically determined based on the set setting value of the aperture,
wherein the first icon is an icon for receiving an instruction for changing the shutter speed, and
wherein the second icon is an icon for receiving an instruction for changing the setting value of the aperture.

14. A control method of an electronic apparatus comprising:

detecting, through touch detection, a touch operation performed on a display unit capable of changing a positional relationship with a housing;
performing control to display a specific icon and set a first range at least partially overlapping with the specific icon as a touch sensitive region of the specific icon in a case where a positional relationship of the display unit with the housing is a first positional relationship, and to display the specific icon on a side close to the housing relative to a center of a display area in the display unit and set a second range wider than the first range on a side opposite to the housing, at least partially overlapping with the specific icon, as a touch sensitive region of the specific icon in a case where a positional relationship of the display unit with the housing is a second positional relationship;
performing control to change a touch sensitive region of an icon based on a positional relationship of the display unit with the housing, and whether a different icon is displayed within a predetermined range from a display area of the icon; and
executing a function corresponding to the specific icon when a touch operation is performed on the touch sensitive region.

15. A non-transitory computer-readable storage medium storing a program that causes a computer to execute a control method of an electronic apparatus, the control method comprising:
detecting, through touch detection, a touch operation performed on a display unit capable of changing a positional relationship with a housing;
performing control to display a specific icon and set a first range at least partially overlapping with the specific icon as a touch sensitive region of the specific icon in a case where a positional relationship of the display unit with the housing is a first positional relationship, and to display the specific icon on a side close to the housing relative to a center of a display area in the display unit and set a second range wider than the first range on a side opposite to the housing, at least partially overlapping with the specific icon, as a touch sensitive region of the specific icon in a case where a positional relationship of the display unit with the housing is a second positional relationship;
performing control to change a touch sensitive region of an icon based on a positional relationship of the display unit with the housing, and whether a different icon is displayed within a predetermined range from a display area of the icon; and
executing a function corresponding to the specific icon when a touch operation is performed on the touch sensitive region.

* * * * *